United States Patent
Yoon et al.

(10) Patent No.: US 11,778,164 B2
(45) Date of Patent: Oct. 3, 2023

(54) DISPLAY APPARATUS INSTALLED IN ELEVATOR, AND IMAGE PROCESSING METHOD

(71) Applicant: DAJIT CO., LTD., Goyang-si (KR)

(72) Inventors: Il Shik Yoon, Seoul (KR); Jun Chan Yoon, Seoul (KR); Jayoung Yoon, Seoul (KR)

(73) Assignee: DAJIT CO., LTD., Goyang-si (KR)

( * ) Notice: Subject to any disclaimer, the term of this patent is extended or adjusted under 35 U.S.C. 154(b) by 0 days.

(21) Appl. No.: 18/021,110

(22) PCT Filed: Jul. 27, 2021

(86) PCT No.: PCT/KR2021/009706
§ 371 (c)(1),
(2) Date: Feb. 13, 2023

(87) PCT Pub. No.: WO2022/035093
PCT Pub. Date: Feb. 17, 2022

(65) Prior Publication Data
US 2023/0231986 A1   Jul. 20, 2023

(30) Foreign Application Priority Data
Aug. 12, 2020 (KR) .......................... 10-2020-0101436

(51) Int. Cl.
*H04N 13/361* (2018.01)
*H04N 7/18* (2006.01)
(Continued)

(52) U.S. Cl.
CPC ........... *H04N 13/361* (2018.05); *B66B 3/002* (2013.01); *G06T 13/20* (2013.01); *H04N 7/181* (2013.01); *H04N 23/698* (2023.01); *H04N 23/90* (2023.01)

(58) Field of Classification Search
CPC .... H04N 13/361; H04N 23/90; H04N 23/698; H04N 7/181; B66B 3/002; G06T 13/20
See application file for complete search history.

(56) References Cited

U.S. PATENT DOCUMENTS 5,004,225 A * 4/1991 Krukovsky ............ A63G 31/16
472/60
5,485,897 A * 1/1996 Matsumoto ............. B66B 3/008
187/397
(Continued)

FOREIGN PATENT DOCUMENTS

JP   2001-255590 A   9/2001
JP   2019-199341 A   11/2019
(Continued)

*Primary Examiner* — Charles L Beard
(74) *Attorney, Agent, or Firm* — Bridgeway IP Law Group, PLLC; Jihun Kim (57) ABSTRACT

A display apparatus capable of being installed in an elevator may include: a monitor unit for displaying an output image; and an image processor configured to display, on the monitor unit, at least one of an external image obtained by photographing an external panoramic view of the elevator and a virtual graphic screen related to the external panoramic view. The monitor unit includes a ceiling monitor extending to be inclined at a predetermined angle with respect to a ceiling part of the elevator. The image processor displays, on the monitor unit, a virtual object for giving an effect of providing a sense of boundary between the inside and outside of the elevator to an occupant in the elevator along with the external panoramic view corresponding to at least one of the external image and the virtual graphic screen.

14 Claims, 8 Drawing Sheets

(51) Int. Cl.
*B66B 3/00* (2006.01)
*H04N 23/698* (2023.01)
*G06T 13/20* (2011.01)
*H04N 23/90* (2023.01)

(56) References Cited

U.S. PATENT DOCUMENTS

| | | | | |
|---|---|---|---|---|
| 6,578,675 | B2* | 6/2003 | Wilson | B66B 3/008 |
| | | | | 187/393 |
| 11,132,838 | B2* | 9/2021 | Cordes | H04N 5/272 |
| D949,729 | S* | 4/2022 | Kollros | D10/108 |
| 11,537,352 | B1* | 12/2022 | Clements | G06Q 20/18 |
| 2010/0315603 | A1* | 12/2010 | Jeng | G03B 21/28 |
| | | | | 353/82 |
| 2016/0174334 | A1* | 6/2016 | Anthony | H05B 47/105 |
| | | | | 315/153 |
| 2017/0113899 | A1* | 4/2017 | Hettema | B66B 9/00 |
| 2017/0264890 | A1* | 9/2017 | Gorilovsky | G03B 37/04 |
| 2017/0355557 | A1* | 12/2017 | Witczak | B66B 3/008 |
| 2018/0162690 | A1* | 6/2018 | Hsu | B66B 3/002 |
| 2018/0273345 | A1* | 9/2018 | Rao | B66B 3/00 |
| 2018/0339878 | A1* | 11/2018 | Fever | B66B 1/50 |
| 2019/0016558 | A1* | 1/2019 | Durand | B66B 11/0226 |
| 2019/0084795 | A1* | 3/2019 | Okuda | B66B 3/002 |
| 2019/0144239 | A1* | 5/2019 | Quaretti | B66B 1/52 |
| | | | | 187/396 |
| 2019/0248623 | A1* | 8/2019 | Yoshizawa | B66B 13/30 |
| 2020/0172372 | A1* | 6/2020 | Tsubaki | G06V 40/161 |
| 2021/0101780 | A1* | 4/2021 | Derwinski | B66B 1/28 |
| 2021/0206598 | A1* | 7/2021 | Roth | B66B 1/468 |
| 2022/0204314 | A1* | 6/2022 | Farberov | B66B 1/3492 |
| 2022/0303407 | A1* | 9/2022 | Peng | H04N 1/00267 |
| 2022/0351092 | A1* | 11/2022 | Okazaki | G06Q 10/02 |
| 2022/0411226 | A1* | 12/2022 | Hori | G08B 5/36 |
| 2023/0179724 | A1* | 6/2023 | Sawada | H04N 1/00907 |
| | | | | 358/1.15 |

FOREIGN PATENT DOCUMENTS

| | | |
|---|---|---|
| KR | 10-2011-0055238 A | 5/2011 |
| KR | 10-1235850 B1 | 2/2013 |
| KR | 10-2217759 B1 | 2/2021 |

* cited by examiner

DISPLAY APPARATUS INSTALLED IN ELEVATOR, AND IMAGE PROCESSING METHOD

TECHNICAL FIELD

The present disclosure relates to a display apparatus, an elevator including the same, and an image processing method.

BACKGROUND ART

In general, an elevator is an apparatus that is installed in a structure such as a high-rise apartment or a building such that occupants can conveniently move to each floor. Such an elevator is necessarily installed in the high-rise building because of the convenience and efficiency of occupants, and as the number of high-rise buildings increases, the number of elevators also tends to increase.

However, since conventional elevators have closed and narrow spaces, and the higher a building, the longer an occupant stays inside an elevator, the occupant using the elevator feels closed or stuffy. In addition, in the case of the elevator installed in a super-high-rise building, there is a disadvantage in that the occupant cannot see the outside view of the elevator at all.

Accordingly, an observatory elevator having walls made of transparent glass has recently been developed in order to prevent the occupant from feeling closed or stuffy. In such an observatory elevator having walls made of glass, the occupant can feel a sense of openness by observing the outside view and thus the occupant can be prevented from feeling closed.

However, in the case of an observatory elevator installed in a high-rise building, the external scenery transmitted through the glass may cause anxiety such as fear of heights for some occupants. In addition, in order to install the observatory elevator, a hoistway through which the elevator moves needs to be made of glass, which excessively increases the costs. Furthermore, the observatory elevator cannot be installed in the central part of a building but needs to be installed outside the building because the external panoramic view must be seen. As a result, the location of the elevator is limited and the movement of the occupant increases, resulting in efficiency deterioration.

Therefore, there is a need for a device capable of preventing for the occupant staying inside the elevator from feeling closed and a fear of heights.

DETAILED DESCRIPTION OF INVENTION

Technical Problems

Embodiments of the present disclosure have been devised in view of the above background and provide an elevator assembly capable of relieving the sense of insecurity and confinement felt by occupants staying inside an elevator by providing a sense of boundary between the inside and outside of the elevator to the occupants.

In addition, embodiments of the present disclosure provide an elevator assembly capable of increasing use efficiency by minimizing movement of occupants.

Further, embodiments of the present disclosure provide an elevator assembly capable of reducing installation costs while increasing use efficiency of occupants.

Technical Solution

In accordance with an aspect of the present disclosure, there may be provided a display apparatus configured to be installed in an elevator, including: a monitor unit for displaying an output image; and an image processor configured to display, on the monitor unit, at least one of an external image obtained by photographing an external panoramic view of the elevator and a virtual graphic screen related to the external panoramic view, wherein the monitor unit includes: a ceiling monitor extending to be inclined at a predetermined angle with respect to a ceiling part of the elevator; and a sidewall monitor extending parallel to a sidewall part of the elevator and extending to be inclined with respect to the ceiling monitor, wherein the image processor displays, on the monitor unit, a virtual object for giving an effect of providing a sense of boundary between the inside and outside of the elevator to an occupant in the elevator along with the external panoramic view corresponding to at least one of the external image and the virtual graphic screen, the external panoramic view changing according to movement of the elevator while the displayed external panoramic view is reproduced on the monitor unit, and moves and displays the virtual object from one point to another point in the changing external panoramic view, and wherein the displayed virtual object moves from the ceiling monitor to the sidewall monitor.

Further, there may be provided the display apparatus further including a photographing unit configured to acquire the external image by photographing the external panoramic view of the elevator.

Further, there may be provided the display apparatus in which the external image includes a first external image and a second external image, the photographing unit includes a first photographing device for acquiring the first external image by photographing a lateral external panoramic view of the elevator and a second photographing device for acquiring the second external image by photographing an upper external panoramic view of the elevator, and the image processor displays the first external image and the virtual object on the sidewall monitor and displays the second external image and the virtual object on the ceiling monitor.

Further, there may be provided the display apparatus in which the ceiling monitor is disposed above the sidewall monitor, the image processor moves the virtual object such that the virtual object passes through a passing point while moving from the upper side to the lower side of the monitor unit, and the passing point is located on an upper edge of the sidewall monitor or a lower edge of the ceiling monitor.

Further, there may be provided the display apparatus in which the image processor frames out the virtual object from the ceiling monitor through the lower edge of the ceiling monitor as the virtual object displayed on the ceiling monitor moves downward, and frames in a portion of the virtual object framed out of the ceiling monitor into the sidewall monitor through the upper edge of the sidewall monitor.

Further, there may be provided the display apparatus further including an information provider for providing weather information outside the elevator, wherein the virtual object includes a plurality of virtual objects, and the image processor selects one of the plurality of virtual objects based on the weather information outside the elevator provided from the information provider and displays the selected virtual object on the monitor unit.

Further, there may be provided the display apparatus further including a speed sensor configured to measure a speed of the elevator, wherein the image processor changes a moving speed of the virtual object based on a speed of the elevator measured by the speed sensor.

Further, there may be provided the display apparatus in which the plurality of virtual objects includes at least one of raindrops formed on a virtual surface, snowflakes formed on the virtual surface, and foreign substances attached to the virtual surface.

Further, there may be provided the display apparatus in which the photographing unit is fixed to the elevator and acquires the external image changing according to movement of the elevator in real time, and the image processor displays the external image acquired in real time on the monitor unit.

In accordance with another aspect of the present disclosure, there may be provided a display apparatus configured to be installed on an inner wall of a building equipped with an elevator, the display apparatus including: a monitor unit for displaying an output image; and an image processor configured to display, on the monitor unit, at least one of an external image obtained by photographing an external panoramic view of the building and a virtual graphic screen related to the external panoramic view, wherein the monitor unit includes: a ceiling monitor extending to be inclined at a predetermined angle with respect to a ceiling wall of the building; and a sidewall monitor extending parallel to a sidewall part of the elevator and extending to be inclined with respect to the ceiling monitor, wherein the image processor displays, on the monitor unit, a virtual object for giving an effect of providing a sense of boundary between the inside and outside of the building to an occupant staying in the building along with the panoramic view corresponding to at least one of the external image and the virtual graphic screen, the external panoramic view changing according to movement of the elevator while the displayed external panoramic view is reproduced on the monitor unit, and moves and displays the virtual object from one point to another point in the changing external panoramic view, and wherein the displayed virtual object moves from the ceiling monitor to the sidewall monitor.

In accordance with further another aspect of the present disclosure, there may be provided an elevator assembly including: an elevator configured to move up and down; and a display apparatus, wherein the elevator includes: a ceiling part; and a sidewall part provided below the ceiling part, the display apparatus includes: a monitor unit supported inside the elevator and displaying an output image; and an image processor configured to display, on the monitor unit, at least one of an external image obtained by photographing an external panoramic view of the elevator and a virtual graphic screen related to the external panoramic view, wherein the monitor unit includes: a ceiling monitor at least a part of which is supported by the ceiling part, the ceiling monitor inclining and extending to be inclined at a predetermined angle with respect to the ceiling part of the elevator; and a sidewall monitor at least a part of which is supported by the sidewall part, the sidewall monitor extending parallel to the sidewall part and inclining with respect to the ceiling monitor, wherein the image processor displays, on the monitor unit, a virtual object for giving an effect of providing a sense of boundary between the inside and outside of the elevator to an occupant in the elevator along with the panoramic view corresponding to at least one of the external image and the virtual graphic screen, the external panoramic view changing according to movement of the elevator while the displayed external panoramic view is reproduced on the monitor unit, and moves and displays the virtual object from one point to another point in the changing external panoramic view, and wherein the displayed virtual object moves from the ceiling monitor to the sidewall monitor.

The image processor may move the virtual object such that the virtual object passes through a passing point while moving from the upper side to the lower side of the monitor unit, and the passing point may be located on the upper edge of the sidewall monitor or the lower edge of the ceiling monitor.

In accordance with further another aspect of the present disclosure, there may be provided an image processing method for processing an image on a display apparatus configured to be installed in an elevator and including a monitor unit, the image processing method including: an image display step of displaying, on the monitor unit, a virtual object for giving an effect of providing a sense of boundary between the inside and outside of the elevator to an occupant in the elevator along with at least one of an external image obtained by photographing an external panoramic view of the elevator and a virtual graphic screen related to the external panoramic view.

The display apparatus may further include a photographing unit, and the image processing method may further include: an image acquisition step of acquiring the external image by photographing the external panoramic view of the elevator through the photographing unit.

The image processing method may further include: an information acquisition step of receiving weather information outside the elevator, and the virtual object may include a plurality of virtual objects, and the image display step includes: an object selection step of selecting one of the plurality of virtual objects based on the weather information; and an object display step of displaying the selected virtual object on the monitor unit.

The image processing method may further include a speed measurement step of measuring a speed of the elevator, and, in the image display step, a moving speed of the virtual object may be changed based on a measured speed of the elevator and the virtual object is displayed on the monitor unit.

In accordance with still further another aspect of the present disclosure, there may be provided a computer-readable recording medium storing a computer program programmed to perform each step included in the method described above.

In accordance with still further another aspect of the present disclosure, there may be provided a computer program stored in a computer-readable recording medium and programmed to perform each step included in the method described above.

Effect of Invention

According to embodiments of the present disclosure, it is possible to relieve the sense of insecurity and confinement felt by an occupant staying inside an elevator by providing a sense of boundary between the inside and outside of the elevator to the occupant.

In addition, it is possible to increase use efficiency by minimizing movement of occupants.

Further, it is possible to reduce installation costs while increasing use efficiency of an occupant.

BEST MODE FOR CARRYING OUT THE INVENTION

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'transferred' to another element, it should be understood that the element may be directly transferred to another element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Further, in the present disclosure, it is to be noted that expressions, such as the upper side and the lateral side, are described based on the illustration of drawings, but may be modified if directions of corresponding objects are changed. Meanwhile, an up and down direction of the present specification may be the up and down direction of FIG. 1.

Hereinafter, a specific configuration of an elevator assembly 1 according to an embodiment of the present disclosure will be described with reference to the drawings.

Figure 1:
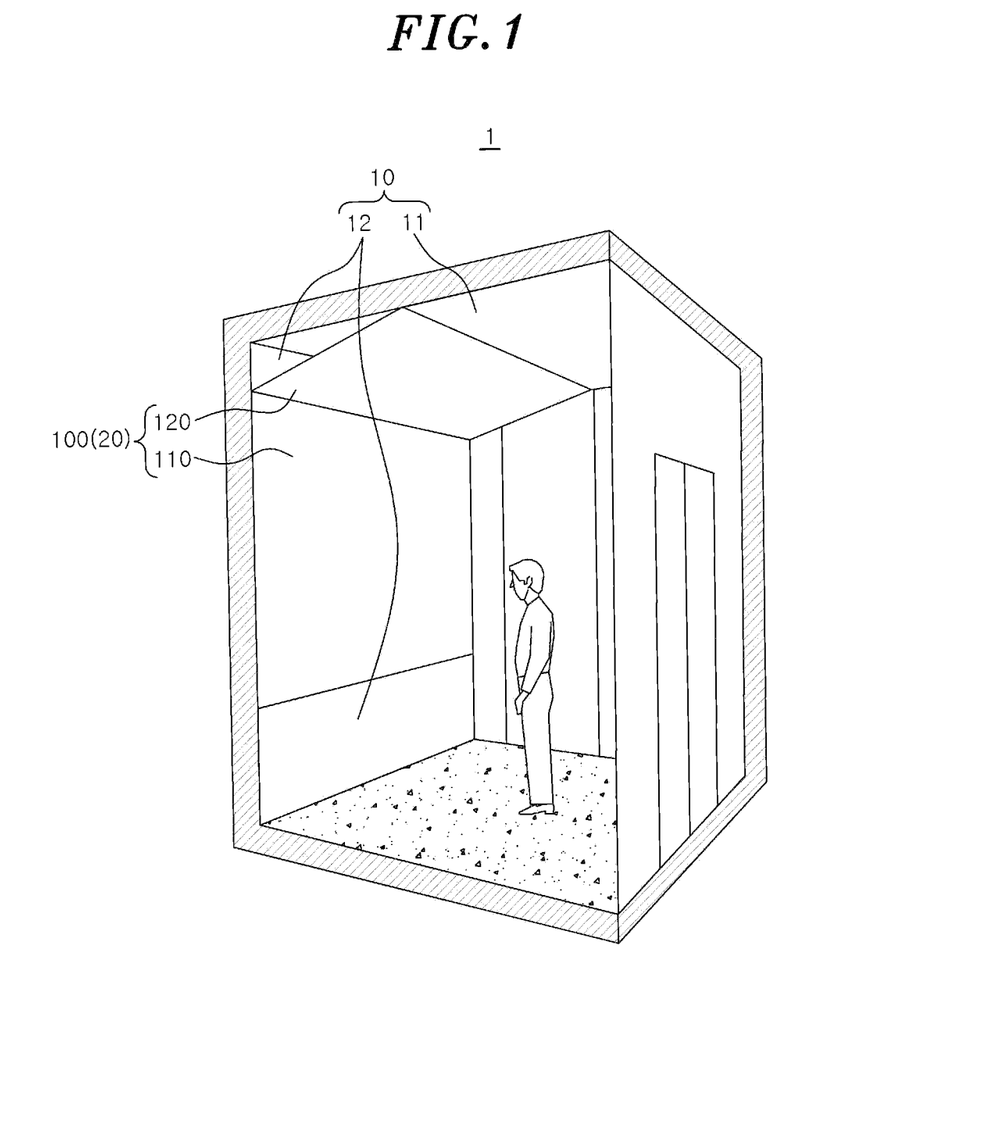
FIG. 1 is a partial perspective view of an elevator according to an embodiment of the present disclosure.

Referring to FIG. 1, the elevator assembly 1 according to the embodiment of the present disclosure may be installed in a building having a plurality of floors and can move an occupant to each floor. The elevator assembly 1 may provide a panoramic view outside the elevator assembly 1 to the occupant staying inside the elevator assembly 1 such that the occupant does not feel stuffy while moving to each floor. In addition, the elevator assembly 1 makes the occupant feel a sense of boundary between the inside and the outside of the elevator assembly 1, thereby eliminating anxiety such as a fear of heights felt by the occupant. The elevator assembly 1 may include an elevator 10 and a display apparatus 20.

The elevator 10 is provided to be movable in a vertical direction and may be provided to transport an occupant. For example, the elevator 10 may receive input of a floor to which the occupant wants to move through an input part (not shown). In addition, the elevator 10 may be provided to be elevated by a motor (not shown) or the like. This elevator 10 may include a ceiling part 11 and a sidewall part 12 to provide a predetermined interior space in which the occupant can stay.

The ceiling part 11 may support a second monitor 120 which will be described later and may be disposed above the sidewall part 12. For example, the ceiling part 11 may extend in the horizontal direction.

The sidewall part 12 may support a first monitor 110 which will be described later, and a plurality of sidewall parts may be provided. For example, the sidewall part 12 may extend in a direction perpendicular to the ground and may be disposed to surround the ceiling part 11.

Figure 2:
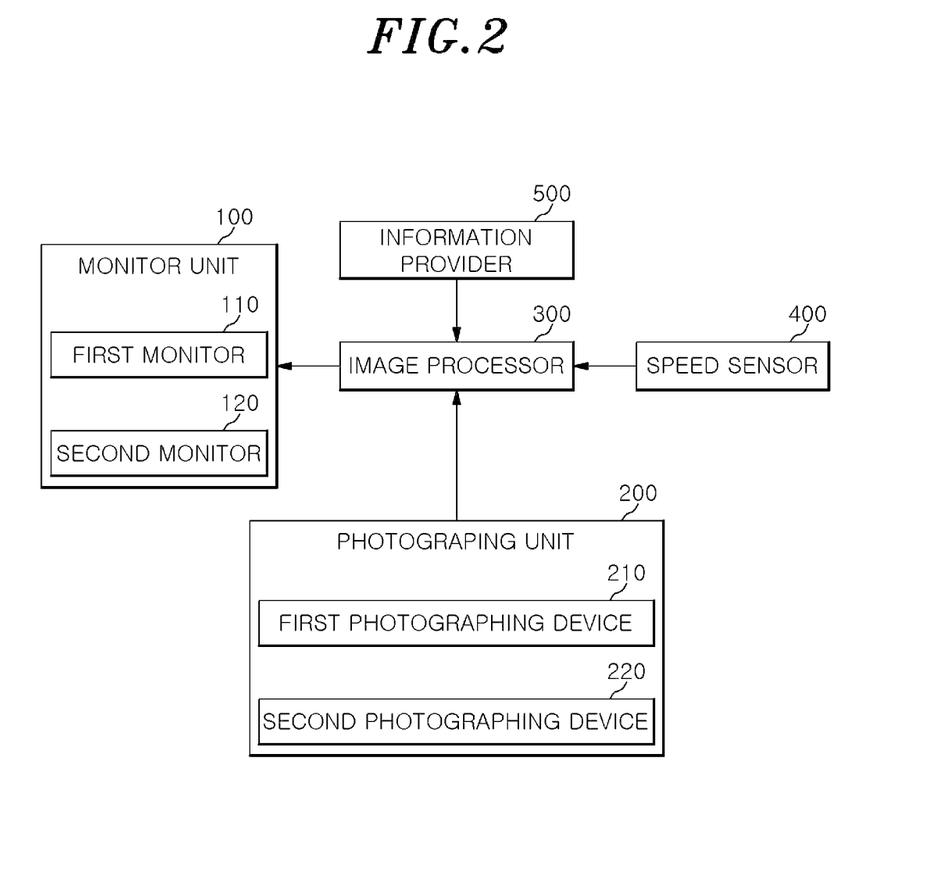
FIG. 2 is a block diagram showing a display apparatus according to the embodiment of the present disclosure.

Referring to FIG. 2, the display apparatus 20 may acquire an external image by photographing an external panoramic view of the elevator 10 and may provide the obtained external image to an occupant. In addition, the display apparatus 20 may display a virtual object (VO) along with the external image such that the occupant can feel a sense of boundary between the inside and outside of the elevator 10. Here, the virtual object VO is an image that gives the occupant in the elevator assembly 1 an effect of providing a sense of boundary between the inside and outside of the elevator 10, and a detailed description thereof will be described later. The display apparatus 20 may include a monitor unit 100, a photographing unit 200, an image processor 300, a speed sensor 400, and an information provider 500.

The monitor unit 100 may display the same output image as an external image acquired by the photographing unit 200 and may display the virtual object VO along with the external image to the occupant. The monitor unit 100 may be supported inside the elevator 10. For example, a well-known means capable of displaying an image, such as a display panel, may be used as the monitor unit 100. The monitor unit 100 may include the first monitor 110 and the second monitor 120.

The first monitor 110 may display the virtual object VO along with a first external image acquired by a first photographing device 210 which will be described later. The first monitor 110 is disposed parallel to the sidewall part 12, and at least a portion of the first monitor 110 may be supported on the sidewall part 12 or the floor of the elevator 10. For example, the first monitor 110 may extend in the vertical direction. Further, an upper edge of the first monitor 110 may be connected to a lower edge of the second monitor 120. However, this is merely an example, and the first monitor 110 and the second monitor 120 may be spaced apart from each other. Meanwhile, the first monitor 110 may be referred to as a sidewall monitor 110 in this specification.

The second monitor 120 may display the virtual object VO along with a second external image obtained by a second photographing device 220 which will be described later. The second monitor 120 may be formed to extend at a predetermined angle with respect to the first monitor 110 and may be formed to extend at a predetermined angle with respect to the ceiling part 11. For example, the second monitor 120 may be formed to extend at a predetermined angle with respect to the horizontal direction. At least a portion of the second monitor 120 may be supported on the ceiling part 11.

Meanwhile, the second monitor 120 may be referred to as a ceiling monitor 120 in this specification.

The photographing unit 200 may acquire an external image by photographing a panoramic view outside the elevator 10. The photographing unit 200 may photograph an external panoramic view of the upper, side, and lower sides of the elevator 10. In addition, the photographing unit 200 may be fixed to the elevator 10 and acquire external images that change according to the movement of the elevator 10 in real time. For example, a well-known means capable of obtaining an image by photographing a panoramic view, such as a camera, may be used as the photographing unit 200. The photographing unit 200 may include the first photographing device 210 and the second photographing device 220.

The first photographing device 210 may acquire the first external image by photographing a lateral external panoramic view of the elevator 10. Here, the lateral external panoramic view refers to an external panoramic view captured when the side of the elevator 10 is photographed toward the outside of the elevator 10 and may be understood as including not only the external panoramic view of the side of the elevator 10 but also a partial external panoramic view between the upper side and the side of the elevator 10 and a partial external panoramic view between the lower side and the side of the elevator 10.

The second photographing device 220 may acquire the second external image by photographing an upper external panoramic view of the elevator 10. Here, the upper external panoramic view refers to an external panoramic view captured when the upper side of the elevator 10 is photographed toward the outside of the elevator 10 and may be understood as including not only an external panoramic view of the upper side of the elevator 10 but also a partial external panoramic view between the upper side and the side of the elevator 10.

Figure 3:
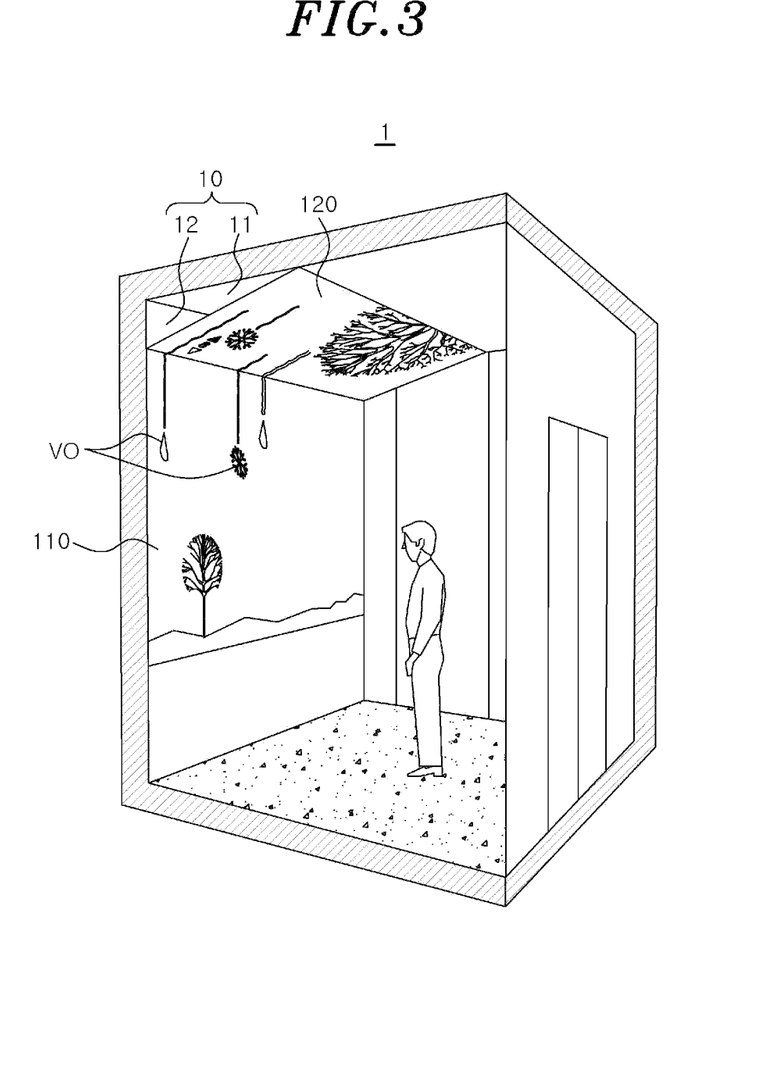
FIG. 3 is a diagram showing a state in which external images and virtual objects are displayed on a monitor unit of FIG. 1.
Figure 4:
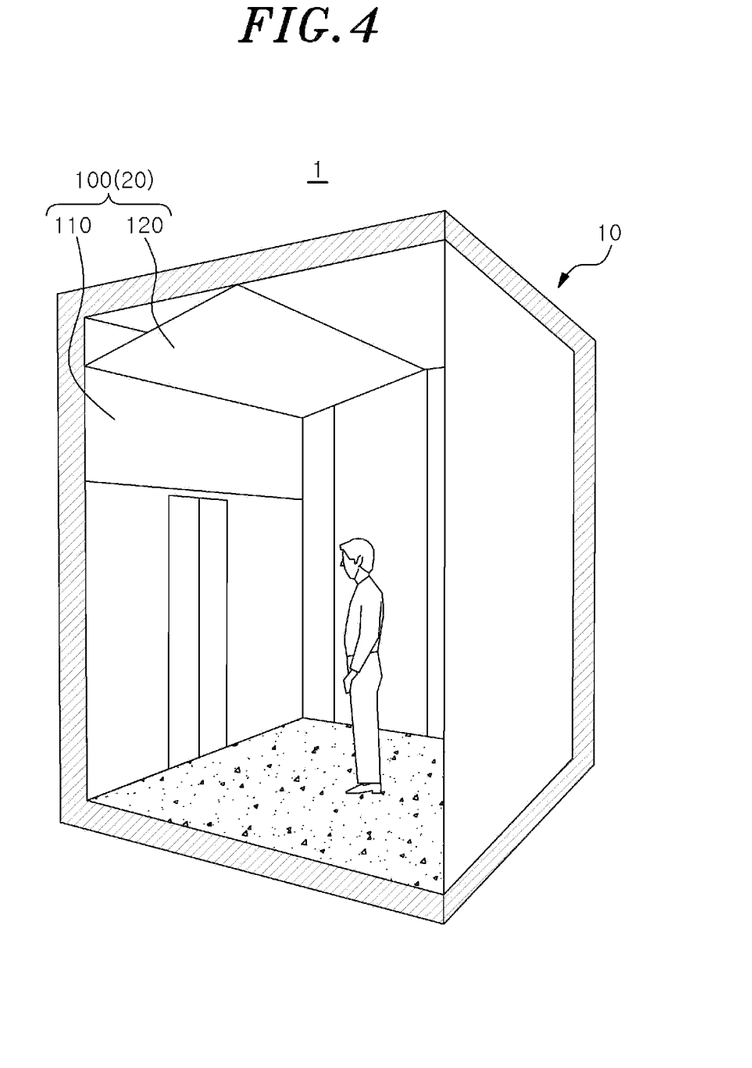
FIG. 4 is a diagram showing a state in which the length of the monitor unit of FIG. 1 is changed.

Referring to FIGS. 3 and 4, the image processor 300 may display at least one of an external image and a virtual graphic screen related to an external panoramic view on the monitor unit 100. In addition, the image processor 300 may mix and display an external image and a virtual graphic screen. The image processor 300 may display the first external image captured by the first photographing device 210 on the first monitor 110 and display the second external image captured by the second photographing device 220 on the second monitor 120. The external image displayed on the monitor unit 100 by the image processor 300 may include not only an image captured in real time through the photographing unit 200 but also an image captured and stored in advance. Further, the virtual graphic screen displayed on the monitor unit 100 by the image processor 300 may include a graphic image stored in advance.

As such, the image processor 300 provides the first external image and the second external image to the occupant through the monitor unit 100 such that the occupant feels less closed and stuffy.

In addition, the image processor 300 may display the virtual object VO along with the external image on the monitor unit 100 such that the occupant in the elevator assembly 1 can feel a sense of boundary between the inside and outside of the elevator 10. In this specification, the virtual object VO may include an image providing an effect of giving a sense of boundary between the inside and outside of the elevator 10. For example, the virtual object VO is displayed on the monitor unit 100, and may be an image providing a three-dimensional effect, such as a virtual object approaching the sidewall part 12 from a point far away from the elevator 10. As a more specific example, a plurality of virtual objects VO may be provided, and the plurality of virtual objects VO may include at least one of falling raindrops, flying snowflakes, and flying foreign substances (e.g., soil, sand, dust, and fine dust).

As another example, the virtual object VO may include an image placed on or moving on a virtual surface to provide an effect of giving a sense of boundary between the inside and outside of the elevator 10. As a more specific example, the virtual object VO may include at least one of raindrops forming on a virtual surface, snowflakes forming on a virtual surface, and foreign substances attached to a virtual surface. Further, the virtual object VO may include water droplets that form on a virtual surface and then flow along the virtual surface. Here, the virtual surface means a plane parallel to the first monitor 110 and a plane parallel to the second monitor 120. This virtual surface may be spaced apart from the first monitor 110 and the second monitor 120 within a predetermined adjacent distance. For example, the virtual surface may be a surface spaced apart from the first monitor 110 and the second monitor 120 by 50 cm. Hereinafter, a virtual surface parallel to the first monitor 110 is defined as a first virtual surface (not shown) and a virtual surface parallel to the second monitor 120 is defined as a second virtual surface (not shown).

As such, the image processor 300 may display a 3D effect, such as an effect that the virtual object VO approaches a virtual surface, forms on the virtual surface, and flows along the virtual surface, on the monitor unit 100 through the virtual object VO. Accordingly, the occupant can recognize that the space where he or she stays is disconnected from the outside by the elevator 10 by viewing the virtual object VO and an external image and feel the boundary between the inside and the outside of the elevator 10. In addition, the occupant does not feel anxiety such as a fear of heights and does not feel a sense of confinement by observing the external panoramic view.

Meanwhile, the image processor 300 may move the virtual object VO within the monitor unit 100. The image processor 300 may move the virtual object VO from one point to another while an external image is being reproduced. For example, the virtual object VO may be displayed such that it moves from the upper side to the lower side of the monitor unit 100. As a more specific example, the image processor 300 may display an image of raindrops falling toward the second virtual surface on the second monitor 120. In this case, the image processor 300 may sequentially display raindrops on the second virtual surface and raindrops flowing from the upper side to the lower side along the second virtual surface on the second monitor 120. In addition, the image processor 300 may display raindrops flowing from the upper side to the lower side along the first virtual surface on the first monitor 110.

As such, since the second monitor 120 is configured to be inclined at a predetermined angle with respect to the first monitor 110 and the ceiling part 11, raindrops displayed on the second monitor 120 appear to move from the upper side to the lower side along the second virtual surface due to gravity. In addition, raindrops displayed on the first monitor 110 appear to move from the upper side to the lower side along the first virtual surface due to gravity. Accordingly, an effect that the occupant more believes that the interior space of the elevator 10 is blocked from the outside is provided.

Further, the image processor 300 may move the virtual object VO such that the virtual object VO passes through a passing point while moving from the upper side to the lower side of the monitor unit 100. For example, the passing point may be located on the upper edge of the first monitor 110 or the lower edge of the second monitor 120. Accordingly, the image processor 300 moves the virtual object VO moving from the upper side to the lower side on the second monitor 120 to the lower edge of the second monitor 120. Further, the image processor 300 moves the virtual object VO from the upper edge of the first monitor 110 to the lower side.

In addition, as the virtual object VO displayed on the second monitor 120 moves downward, the image processor 300 may frame out the virtual object VO from the second monitor 120 through the lower edge of the second monitor 120. In addition, the image processor 300 may frame in the framed out portion of the virtual object VO from the second monitor 120 to the first monitor 110 through the upper edge of the first monitor 110. Here, "frame out" means that the virtual object VO goes out from the screen of the monitor unit 100, and "frame in" means that the virtual object VO comes in from the outside of the screen of the monitor unit 100. As a more specific example, raindrops flowing from the upper side to the lower side along an inclined surface, displayed on the second monitor 120, are framed out and disappear upon reaching the lower edge of the second monitor 120. In addition, the framed out portion of the raindrops is framed in from the upper edge of the first monitor 110 and displayed on the first monitor 110, and raindrops flowing from the upper side to the lower side are sequentially displayed on the first monitor 110.

As described above, the image processor 300 may provide an effect that the virtual object VO displayed on the second monitor 120 appears to continuously move from the second monitor 120 to the first monitor 110 to the occupant. Therefore, raindrops displayed on the second monitor 120 appear to the occupant as if they continuously flow on surfaces (inclined surface and vertical surface) having different inclination angles. Accordingly, an effect that the occupant more believes that the interior space of the elevator 10 is blocked from the outside is provided.

Meanwhile, the image processor 300 may change the moving speed of the virtual object VO based on the speed of the elevator. For example, when the speed of the elevator 10 increases, the image processor 300 may increase the moving speed of the virtual object VO on the monitor unit 100. The image processor 300 may receive the speed of the elevator from the speed sensor 400.

In addition, the image processor 300 may select one of a plurality of virtual objects VO based on weather information outside the elevator 10 and display the selected virtual object VO on the monitor unit 100. For example, when snow falls outside the elevator 10, the image processor 300 may select the virtual object VO as snowflakes and display snowflakes that scatter or form on a virtual surface on the monitor unit 100. The image processor 300 may receive weather information from the information provider 500. In addition, the image processor 300 may be implemented by an arithmetic device including a processor and a memory, and the implementation method is obvious to those skilled in the art and thus further detailed description is omitted.

The speed sensor 400 may measure the speed of the elevator 10 and may be provided in the elevator 10.

The information provider 500 may receive weather information outside the elevator 10. The information provider 500 may transmit/receive data related to weather information to/from an external server (not shown) through a wired or wireless communication method. For example, the information provider 500 may operate according to any one of Wi-Fi, Bluetooth, near field communication (NFC), a radio frequency (RF), and infrared communication. However, this is merely an example, and the information provider 500 may detect the weather outside the elevator 10 based on information measured from a sensor part (not shown) including at least one of a temperature sensor, a humidity sensor, and a sunlight sensor.

Meanwhile, the monitor unit 100 according to the embodiment of the present disclosure may have various lengths, and a plurality of monitor units may be provided. Referring to FIG. 4, the length of the first monitor 110 in the vertical direction may be adjusted such that the first monitor 110 is positioned on the upper side of the entrance of the elevator 10.

Figure 5:
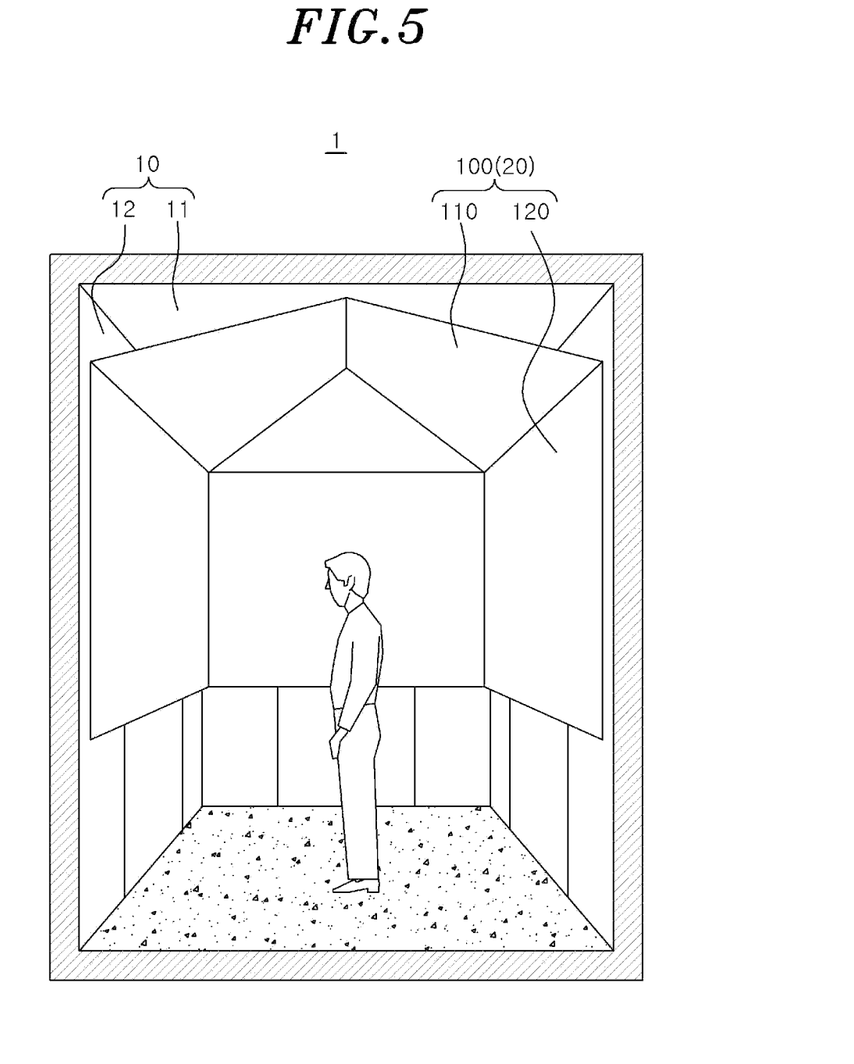
FIG. 5 is a diagram showing a state in which a plurality of monitor units of FIG. 1 is provided.

Referring to FIG. 5, a plurality of monitor units 100 may be provided and may be supported by the elevator 10. In this case, the occupant can see a wider lateral external panoramic view and an upper external panoramic view and can feel a greater sense of openness.

Figure 6:
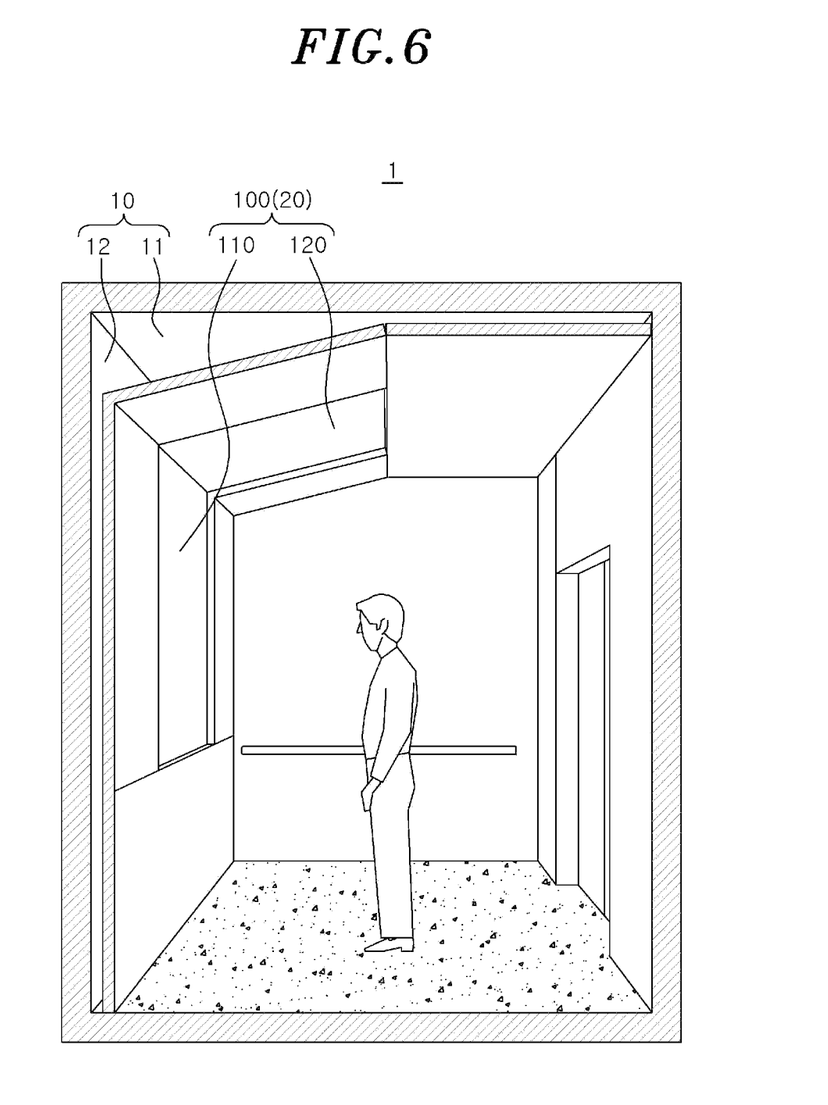
FIG. 6 is a diagram showing a state in which the monitor unit of FIG. 1 is disposed inside a main body.

Referring to FIG. 6, the ceiling part 11 and the sidewall part 12 may cover parts of the monitor unit 100. Accordingly, the size of the portion where an external image is displayed in the monitor unit 100 can be adjusted by the ceiling part 11 and the sidewall part 12.

Meanwhile, the image processor 300 may display an indicator indicating information on the elevator 10, such as the number of a floor on which the elevator 10 is located and air conditions inside the elevator 10, on the second monitor 120. Therefore, the occupant raises his or her head upward to check the indicator displayed on the second monitor 120, and thus the occupant has the effect of naturally exercising the neck.

Figure 7:
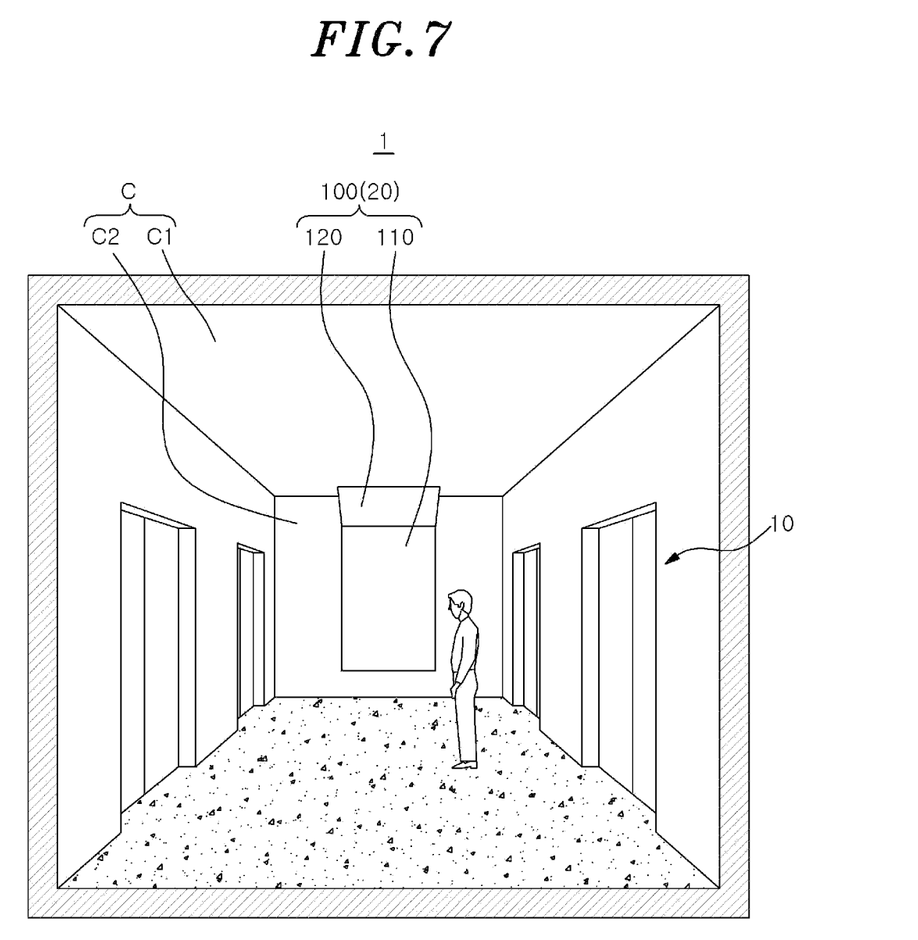
FIG. 7 is a diagram showing a state in which the display apparatus according to the embodiment of the present disclosure is installed in a hallway of a building.

Although an example in which the display apparatus 20 according to the embodiment of the present disclosure is installed in the elevator 10 has been described, the spirit of the present invention is not necessarily limited thereto. As another example, as shown in FIG. 7, the display apparatus 20 may be provided on inner walls C1 and C2 of a building including a corridor C and the like. In this case, the second monitor 120 is inclined and extended to form a predetermined angle with respect to the ceiling wall C1 of the corridor C and may be supported by the ceiling wall C1 of the corridor C. In addition, the first monitor 110 may be parallel to the sidewall C2 of the corridor C and may be supported by the sidewall C2 of the corridor C. Further, the image processor 300 may display a virtual object along with at least one of an external image and a virtual graphic screen on the monitor unit 100 to a user staying in the corridor C.

Accordingly, an occupant waiting in the corridor C to board the elevator 1 can feel a sense of openness.

Figure 8:
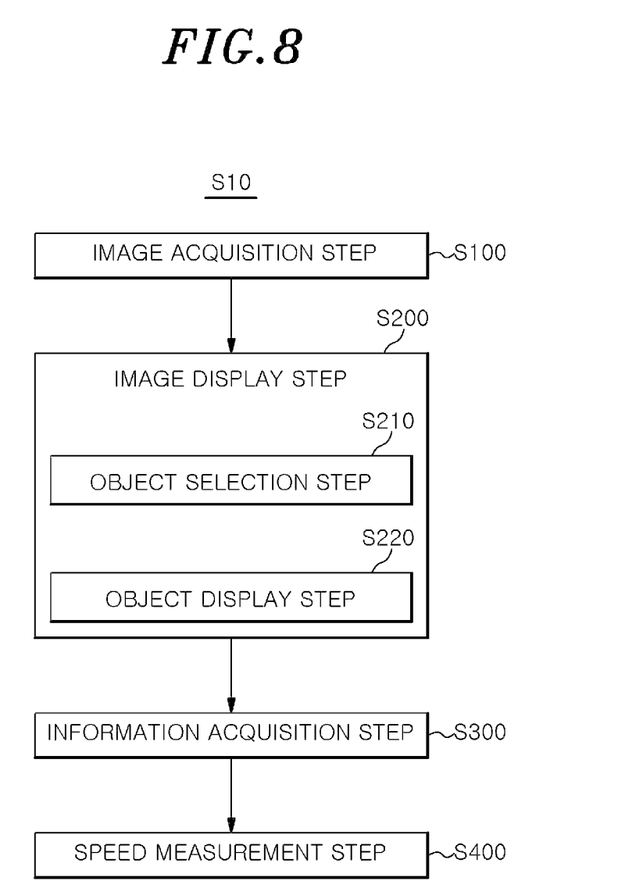
FIG. 8 is a flowchart conceptually illustrating an image processing method according to the embodiment of the present disclosure.

Hereinafter, an image processing method S10 of processing an image using the display apparatus 20 according to the embodiment of the present disclosure will be described with reference to FIG. 8.

In the image processing method S10, an external image obtained by photographing the outside of the elevator 10 may be displayed on the monitor unit 100, and the virtual object VO may be displayed on the monitor unit 100 along with the external image. This image processing method S10 may include an image acquisition step S100, an image display step S200, an information acquisition step S300, and a speed measurement step S400.

In the image acquisition step S100, an external image may be obtained by photographing the outside of the elevator 10. In the image acquisition step S100, a first external image and a second external image may be acquired through the first and second photographing devices 210 and 220.

In the image display step S200, a virtual object VO, which provides an occupant a sense of boundary between the inside and outside of the elevator 10, is displayed on the monitor unit 100 along with at least one of the external image and a virtual graphic screen related to the external panoramic view. This image display step S200 may include an object selection step S210 and an object display step S220.

In the object selection step S210, one of a plurality of virtual objects VO may be selected based on weather information provided in the information acquisition step S300.

In the object display step S220, the virtual object VO selected in the object selection step S210 may be displayed on the monitor unit 100 along with an external image. Further, in the object display step S220, the moving speed of the virtual object VO may be changed based on the speed of the elevator 10 measured in the speed measurement step S400 and displayed on the monitor unit 100.

In the information acquisition step S300, weather outside the elevator 10 may be provided through the information provider 500.

In the speed measurement step S400, the speed of the elevator 10 may be measured through the speed sensor 400. The speed of the elevator 10 measured in the speed measurement step S400 may be transmitted to the image processor 300.

As described above, the display apparatus 20 according to the embodiment of the present disclosure provides an external image to an occupant through the monitor unit 100, thereby preventing the occupant from feeling closed and stuffy.

In addition, the display apparatus 20 may provide a 3D effect for giving a sense of boundary between the inside and outside of the elevator 10 to the occupant through the virtual object VO. Accordingly, the occupant can recognize that the space where the occupant stays is blocked from the outside by the elevator 10 by viewing the virtual object VO and the external image and feel the boundary between the inside and the outside of the elevator 10. In addition, the occupant does not feel anxiety such as a fear of heights.

Furthermore, since the second monitor 120 is provided to have a predetermined inclination with respect to the first monitor 110 and the ceiling part 11, the movement of the virtual object VO such as raindrops by gravity is more effectively transmitted to the occupant. In addition, the first monitor 110 and the second monitor 120 are connected such that the virtual object VO is displayed as if it continuously moves from the second monitor 120 to the first monitor 110, and thus the occupant feels the boundary more effectively.

In addition, since a hoistway needs not be made of glass and the elevator assembly 1 needs not be installed on the outer wall side of a building, the elevator assembly 1 can be installed at the center of the building to minimize the movement of the occupant. As a result, it is possible to increase the use efficiency of the occupant and reduce the installation cost of the elevator assembly 1.

Combinations of each block of the block diagram and each step of the flowchart accompanying the present invention may be executed by computer program instructions. Since these computer program instructions may be loaded on an encoding processor of a general-purpose computer, a special-purpose computer, or other programmable data processing equipment, the instructions executed by the encoding processor of the computer or other programmable data processing equipment generate means for executing functions described in each block of the block diagram and each step of the flowchart. These computer program instructions may also be stored in a computer usable or computer readable memory that can be directed to a computer or other programmable data processing equipment to implement functions in a particular way, and thus it is also possible for the instructions stored in the computer usable or computer readable memory to produce products containing instruction means for executing the functions described in each block of the block diagram or each step of the flowchart. The computer program instructions can also be loaded on a computer or other programmable data processing equipment, and thus a series of operational steps are performed on the computer or other programmable data processing equipment to create a computer-executed process, and thus it is also possible for the instructions performing the computer or other programmable data processing equipment to provide steps for executing the functions described in each block of the block diagram and each step of the flowchart.

In addition, each block or each step may represent a module, a segment or a portion of code that includes one or more executable instructions for executing specified logical function(s). It should be noted that, in some alternative embodiments, it is possible for the functions mentioned in blocks or steps to occur out of order. For example, two blocks or steps shown in succession may be performed substantially simultaneously, or the blocks or steps may sometimes be performed in reverse order depending on their functions.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A display apparatus configured to be installed in an elevator, comprising:
   a monitor unit for displaying an output image; and
   an image processor configured to display, on the monitor unit, at least one of an external image obtained by photographing an external panoramic view of the elevator and a virtual graphic screen related to the external panoramic view, wherein the monitor unit includes:
   a ceiling monitor extending to be inclined at a predetermined angle with respect to a ceiling part of the elevator; and
   a sidewall monitor extending parallel to a sidewall part of the elevator and extending to be inclined with respect to the ceiling monitor, wherein the image processor displays, on the monitor unit, a virtual object for giving an effect of providing a sense of boundary between inside and outside of the elevator to an occupant in the elevator to be distinguished from the external panoramic view corresponding to at least one of the external image and the virtual graphic screen, the external panoramic view changing according to movement of the elevator while the displayed external panoramic view is reproduced on the monitor unit, and moves and displays the virtual object from one point to another point in the changing external panoramic view, and wherein the virtual object is displayed on the monitor unit so as to move in a direction different from a movement direction of the elevator and at a speed different from a movement speed of the elevator, and the displayed virtual object moves from the ceiling monitor to the sidewall monitor, wherein the image processor frames out the virtual object from the ceiling monitor through a lower edge of the ceiling monitor as the virtual object displayed on the celling monitor moves downward, and frames in a portion of the virtual object framed out of the ceiling monitor into the sidewall monitor through an upper edge of the sidewall monitor.

2. The display apparatus of claim 1, further comprising a photographing unit configured to acquire the external image by photographing the external panoramic view of the elevator.

3. The display apparatus of claim 2, wherein the external image includes a first external image and a second external image,
wherein the photographing unit includes a first photographing device for acquiring the first external image by photographing a lateral external panoramic view of the elevator and a second photographing device for acquiring the second external image by photographing an upper external panoramic view of the elevator, and
wherein the image processor displays the first external image and the virtual object on the sidewall monitor and displays the second external image and the virtual object on the ceiling monitor.

4. The display apparatus of claim 1, wherein the ceiling monitor is disposed above the sidewall monitor,
wherein the image processor moves the virtual object such that the virtual object passes through a passing point while moving from an upper side to a lower side of the monitor unit, and
wherein the passing point is located on the upper edge of the sidewall monitor or the lower edge of the ceiling monitor.

5. The display apparatus of claim 1, further comprising an information provider for providing weather information outside the elevator,
wherein the virtual object includes a plurality of virtual objects, and the image processor selects one of the plurality of virtual objects based on the weather information outside the elevator provided from the information provider and displays the selected virtual object on the monitor unit.

6. The display apparatus of claim 1, further comprising a speed sensor configured to measure a speed of the elevator,
wherein the image processor changes a moving speed of the virtual object based on a speed of the elevator measured by the speed sensor.

7. The display apparatus of claim 5, wherein the plurality of virtual objects includes at least one of raindrops formed on a virtual surface, snowflakes formed on the virtual surface, and foreign substances attached to the virtual surface.

8. The display apparatus of claim 2, wherein the photographing unit is fixed to the elevator and acquires the external image changing according to movement of the elevator in real time, and
wherein the image processor displays the external image acquired in real time on the monitor unit.

9. The display apparatus of claim 1, wherein the virtual object is displayed on the monitor unit so as to move in a direction different from a direction in which the external panoramic view changes, and move at a speed different from a moving speed of the external panoramic view.

10. An image processing method for processing an image on a display apparatus configured to be installed in an elevator and including a monitor unit and an image processor, the image processing method including:
an image display step of displaying, on the monitor unit, a virtual object for giving an effect of providing a sense of boundary between inside and outside of the elevator to an occupant in the elevator to be distinguished from at least one of an external image obtained by photographing an external panoramic view of the elevator and a virtual graphic screen related to the external panoramic view, wherein the external panoramic view changes according to movement of the elevator while the displayed external panoramic view is reproduced on the monitor unit, and the displayed virtual object moves from one point to another point in the changing external panoramic view,
wherein the monitor unit includes:
a ceiling monitor extending to be inclined at a predetermined angle with respect to a ceiling part of the elevator; and
a sidewall monitor extending parallel to a sidewall part of the elevator and extending to be inclined with respect to the ceiling monitor, and wherein, in the image display step, the virtual object is displayed on the monitor unit so as to move in a direction different from a movement direction of the elevator and at a speed different from a movement speed of the elevator, and the displayed virtual object moves from the ceiling monitor to the sidewall monitor, wherein the image processor frames out the virtual object from the ceiling monitor through a lower edge of the ceiling monitor as the virtual object displayed on the ceiling monitor moves downward, and frames in a portion of the virtual object framed out of the celling monitor into the sidewall monitor through an upper edge of the sidewall monitor.

11. The image processing method of claim 10, wherein the display apparatus further includes a photographing unit, and wherein the image processing method further includes:
an image acquisition step of acquiring the external image by photographing the external panoramic view of the elevator through the photographing unit.

12. The image processing method of claim 10, further comprising:
an information acquisition step of receiving weather information outside the elevator,
wherein the virtual object includes a plurality of virtual objects, and
the image display step includes:
an object selection step of selecting one of the plurality of virtual objects based on the weather information; and
an object display step of displaying the selected virtual object on the monitor unit.

13. The image processing method of claim 10, further comprising: a speed measurement step of measuring a speed of the elevator,
wherein, in the image display step, a moving speed of the virtual object is changed based on a measured speed of the elevator and the virtual object is displayed on the monitor unit.

14. A display apparatus configured to be installed on an inner wall of a building equipped with an elevator, the display apparatus comprising:
a monitor unit for displaying an output image; and
an image processor configured to display, on the monitor unit, at least one of an external image obtained by photographing an external panoramic view of the building and a virtual graphic screen related to the external panoramic view, wherein the monitor unit includes:
a ceiling monitor extending to be inclined at a predetermined angle with respect to a ceiling wall of the building; and
a sidewall monitor extending parallel to a sidewall part of the elevator and extending to be inclined with respect to the ceiling monitor, wherein the image processor displays, on the monitor unit, a virtual object for giving an effect of providing a sense of boundary between inside and outside of the building to an occupant staying in the building to be distinguished from the external panoramic view corresponding to at least one of the external image and the virtual graphic screen, wherein the external panoramic view changing according to movement of the elevator while the displayed external panoramic view is reproduced on the monitor unit, and moves and displays the virtual object from one point to another point in the changing external panoramic view, and wherein the virtual object is displayed on the monitor unit so as to move in a direction different from a movement direction of the elevator and at a speed different from a movement speed of the elevator, and the displayed virtual object moves from the ceiling monitor to the sidewall monitor, wherein the external image includes a first external image and a second external image, wherein a photographing unit includes a first photographing device for acquiring the first external image by photographing a lateral external panoramic view of the elevator and a second photographing device for acquiring the second external image by photographing an upper external panoramic view of the elevator, and wherein the image processor displays the first external image and the virtual object on the sidewall monitor and displays the second external image and the virtual object on the ceiling monitor.

* * * * *